United States Patent [19]

Gristina

[11] Patent Number: 4,569,322
[45] Date of Patent: Feb. 11, 1986

[54] HOT PLATE FUEL VAPORIZER

[76] Inventor: Nicholas Gristina, 4401 Knight Dr., New Orleans, La. 70127

[21] Appl. No.: 637,558

[22] Filed: Aug. 3, 1984

[51] Int. Cl.⁴ .................... F02M 25/06; F02M 31/04
[52] U.S. Cl. .................................. 123/568; 123/547; 123/590
[58] Field of Search ............... 123/543, 547, 568, 590

[56] References Cited

U.S. PATENT DOCUMENTS

| | | | |
|---|---|---|---|
| 3,459,162 | 8/1969 | Burwinkle et al. | 123/547 X |
| 3,846,980 | 11/1974 | Depalma | 123/547 X |
| 3,911,882 | 10/1975 | Thornburgh | 123/547 |
| 4,359,035 | 11/1982 | Johnson | 123/593 |
| 4,379,443 | 4/1983 | Granger | 123/590 X |

Primary Examiner—Craig R. Feinberg
Assistant Examiner—W. R. Wolfe
Attorney, Agent, or Firm—Cushman, Darby & Cushman

[57] ABSTRACT

A fuel vaporizing device for use with a carburetor to more efficiently vaporize and distribute the fuel portion of the air/fuel mixture. The device is mounted between the carburetor and intake manifold and positions a hot plate element in the flow path of each carburetor barrel discharge. Each hot plate is comprised of a solid metal disk in which a plurality of through bores are formed. Heat is supplied by a conduit extending through the disk, but does not intersect any of the through bores. The conduit is connected to both the intake and exhaust manifolds so that hot exhaust gas passes therethrough at relatively high velocity. To assure uniform flows of exhaust gas, an exhaust reservoir is provided in the connecting line between the exhaust manifold and the vaporizing device.

1 Claim, 3 Drawing Figures

INTAKE FROM EXHAUST CONDUIT

EXHAUST TO INTAKE MANIFOLD OR VACUUM SUPPLY

HOT PLATE FUEL VAPORIZER

FIELD OF THE INVENTION

The present invention relates to fuel vaporizers for use with engines.

BACKGROUND OF THE PRESENT INVENTION

The fuel system of every engine, of course, requires appropriate means to regulate the quantity of both air and fuel and to provide a properly mixed air/fuel mixture to the engine. Liquid fuel, having been drawn from a fuel tank by a fuel pump and delivered through various filters will ultimately arrive at a carburetor where the fuel is measured and mixed with air. At this point, the liquid fuel begins to vaporize. If the liquid fuel is not fully vaporized, it can form puddles along the intake manifold, will not appropriately burn, and the cylinders farthest from the carburetor will receive too lean a mixture. One known technique to aid with this vaporization is to place the carburetor itself directly on top of the intake manifold with that portion of the intake manifold in turn being placed directly on top of the exhaust manifold so that rising heat from the exhaust manifold creates a "hot spot" in the intake manifold which helps vaporization occur. The more completely the fuel is vaporized in the air, the more even its distribution within the fuel mixture and to each of the cylinders.

It is also known that gasoline evaporates more rapidly in a partial vacuum than it does at atmospheric pressures, and the rate of evaporation depends, in part, upon the degree of vacuum in the intake manifold itself. As engine speeds increase, such as when the throttle is fully open, there may be so little vacuum that some of the fuel remains in liquid form and is either carried along in droplets by the in rushing air or will flow along the walls of the intake manifold.

Over the years, a number of concepts have been developed to assist the vaporization of the fuel and each of these various concepts has involved heating the area where vaporization is to occur in order to improve fuel vaporization. The source of heat for this purpose generally is developed from one of three sources, either through separate electric heaters, hot coolant or hot exhaust gases.

Two references that deal with the use of electric heating elements to help fuel vaporization include Jordan, U.S. Pat. No. 3,930,477 and Granger, U.S. Pat. No. 4,379,443. Jordan shows the use of a resistance heating element in combination with an injector nozzle. The heating element is the form of a cylindrical element positioned in the intake manifold adjacent an intake valve operative to emit an air/fuel mixture into a cylinder. With the heating element positioned between the fuel injector and that intake valve, fuel injected is immediately exposed to radiant heat from the electric element and is vaporized.

In Granger, a hollow housing is employed with the housing including an interior baffle plate. The housing includes openings in the upper and lower walls and the intermediate baffle plate can either include a plurality of openings across its surface or at least one marginal portion of that baffle is spaced from an opposing sidewall of the housing. The baffle is used to establish turbulence within the air/fuel mixture flowing through the heating element in order to promote a more complete vaporization of the fuel in the fuel and air mixture. Included as well within the housing, is an electrical heating coil with portions of the heating coil being in registry with openings on one side of the housing.

Vaporizing approaches using the hot coolant liquids are Hollabaugh, U.S. Pat. No. 3,150,652 and Wood, U.S. Pat. No. 4,029,065. Hollabaugh states that the coolant from his liquid cooled engine, which frequently exceeds 180° F., is employed to heat a hollow chamber that surrounds passageways through which the air/fuel mixture will flow in order to thereby promote fuel vaporization. The structure in Hollabaugh includes a fairly thin chamber that is mounted between the carburetor and the intake manifold.

In Wood, the heating device is in the form of a mounting plate in which two through bores have been cut to axially align with the barrels of the carburetor, the device being inserted between the carburetor and the throttle body. The device includes a conduit structure which passes into the device, through each of the two through bores, out the opposite side. Within each of the bores, a series of fins extend transversely thereacross and in an axial direction with respect to the coolant conduit. The air/fuel mixture will pass over both the conduit and the fins and, accordingly, the heat exchanger effect will aid and enhance fuel vaporization.

With respect to the use of exhaust gases as a source of heat, the patents I am aware of are Shum, U.S. Pat. No. 1,269,753; Christian, U.S. Pat. No. 3,042,016; Finley et al, U.S. Pat. No. 4,167,165 and Varner et al, U.S. Pat. No. 4,167,166.

Shum relates to a fuel vaporizer comprised of a pipe extending through the sidewalls of the intake manifold with fins being provided along that pipe. The pipe is connected directly to the exhaust system, so that exhaust gases will flow through the pipe and heat the fins. Consequently, the air/fuel mixture passing through the intake manifold will likewise be heated by its direct passage over the pipe and fin structure.

In a somewhat similar manner, Finley et al relates to a direct heat exchange device that will also be placed in the air/fuel stream with the exhaust gas passing through heat exchange tubes, around which fins are formed, with the air/fuel mixture passing over those tubes and thus heated. The heat exchange tubes also extend perpendicularly to the flow direction of the air/fuel mixture.

Christian also discloses a block structure, insertable beneath the carburetor that is provided with two through bores. In a manner somewhat similar to Wood, a conduit extends through the sidewall of the insert device and passes through both of the through bores and then back out through the same side of the block where it entered. One end of the conduit is connected to the exhaust manifold so that products of combustion can be withdrawn therefrom. The other end terminates directly to the atmosphere or, as stated in the patent, "may deliver the exhaust gases to any other desired and suitable destination."

In Varner et al, the object is to insert hot air into the carburetor bore to help vaporize the air/fuel charge prior to its induction into the engine. The air is introduced at a very low flow rate and is comprised of highly heated auxiliary air. Delivery occurs through distributor pipes that produce a defused and uniform flow rate with respect to each of the carburetor barrels. This is accomplished by using perforated distributor tubes each mounted within a spacer block mounted below the carburetor, atop the intake manifold, with the tubes themselves located within a respective one of the Venturi openings.

SUMMARY OF THE PRESENT INVENTION

The present invention relates to a fuel vaporizing device mounted within a spacer block positioned between the entrance to the intake manifold and the carburetor. That mounting block includes a plurality of perforated hot plates with each hot plate being located within the mounting block so as to be directly adjacent a respective one of the barrels of the carburetor with which it is associated. A conduit is connected so as to pass from the exhaust manifold through the mounting block and each of the hot plates and to the intake manifold so that positive vacuum or suction pressure within the intake manifold will pull exhaust gas at a relatively high flow rate through the conduit and also through each of the hot plates. Adjacent the point at which the conduit connects to the exhaust manifold is a separate exhaust reservoir, comprised of an enlarged area within the conduit. This reservoir allows a relatively large quantity of exhaust gas to be collected so that the velocity of the exhaust gas stream passing through the conduit can be maintained to thereby improve the efficiency of the fuel vaporizer according to this invention.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EXEMPLARY EMBODIMENT OF THE PRESENT INVENTION

Turning now to the FIGURES, an engine, generally indicated at 10, is of conventional design and includes a fuel system generally indicated at 12 comprised of an air filter 14, a carburetor 16, and an intake manifold 18 as well as an exhaust manifold 20. Located between the bottom of the carburetor 16 and the top of intake manifold 18, is the present invention, which is generally indicated at 22.

Figure 2:
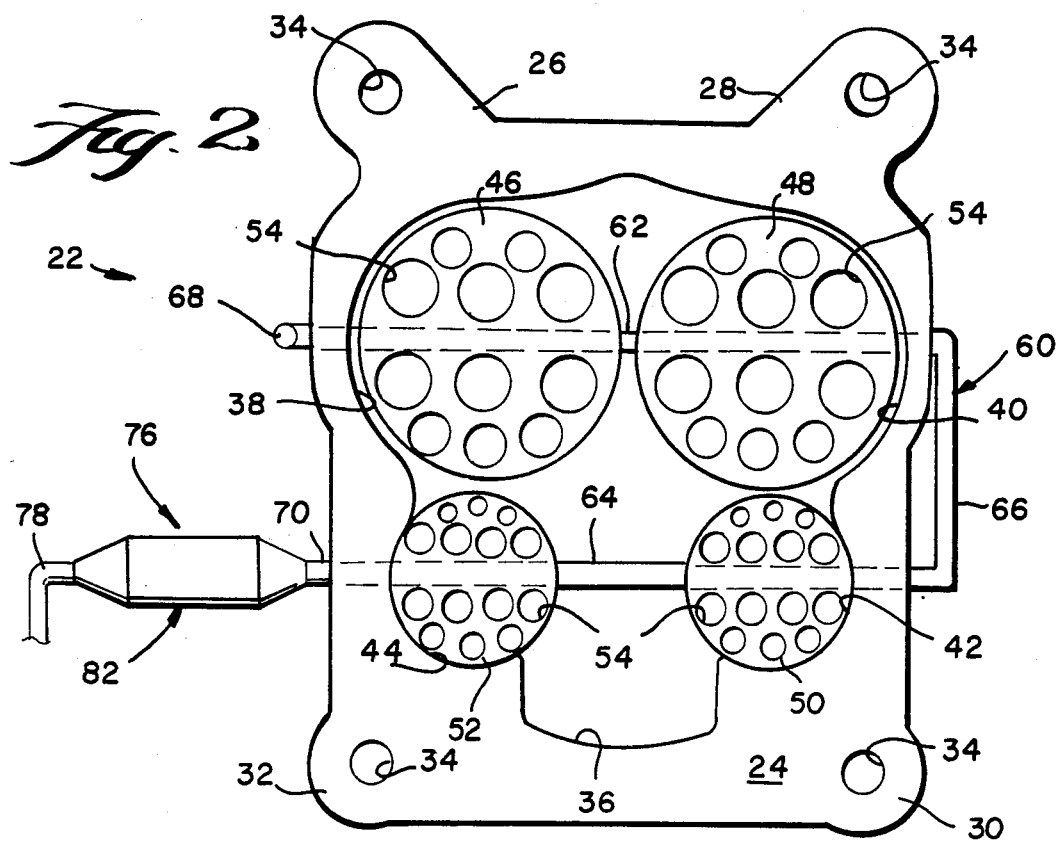
FIG. 2 is a top, plan view of the fuel vaporizer according to the present invention.
Figure 3:
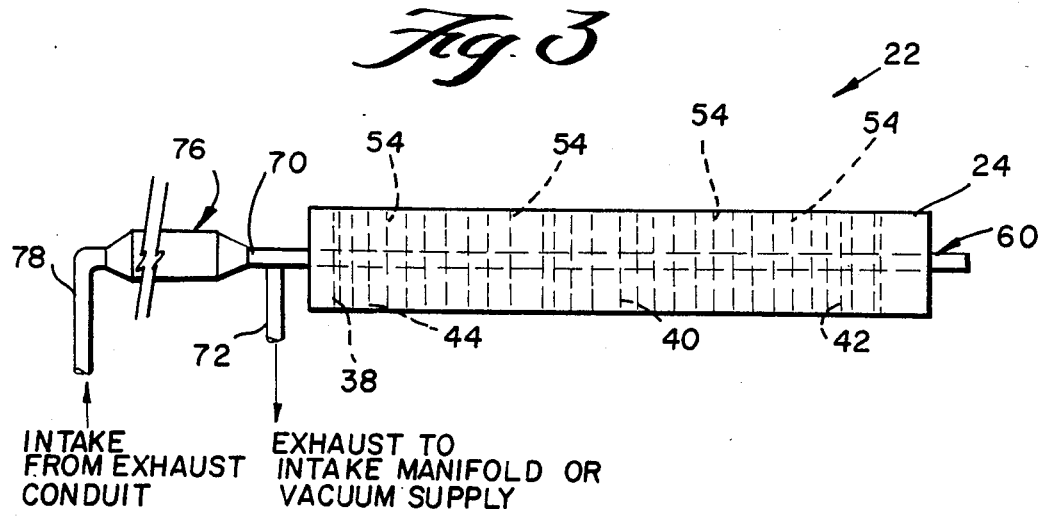
FIG. 3 is a side, elevational view of the fuel vaporizer shown in FIG. 2.

With reference to FIGS. 2 and 3, the fuel vaporizer 22 according to the present invention is comprised of a mounting structure or plate 24 having mounting connections provided at each of its corners, indicated at 26–32, each of which includes a through bore 34 so that mounting plate 24 can be secured between carburetor 16 and intake manifold 18. The interior of mounting plate 24 is hollowed out, as indicated at 36, and includes four circular recesses generally indicated at 38, 40, 42 and 44.

Located within each one of those circular recesses is a separate hot plate 46, 48, 50 and 52, respectively. These can be held in place by any conventional means. The mounting plate 24 is itself approximately $\frac{3}{8}$ to $\frac{1}{2}$ inch thick with each of the hot plates themselves being about $\frac{3}{8}$ths of an inch thick. In addition, each of the hot plates 46–52 is provided with a plurality of through bores, as indicated at 54.

Figure 1:
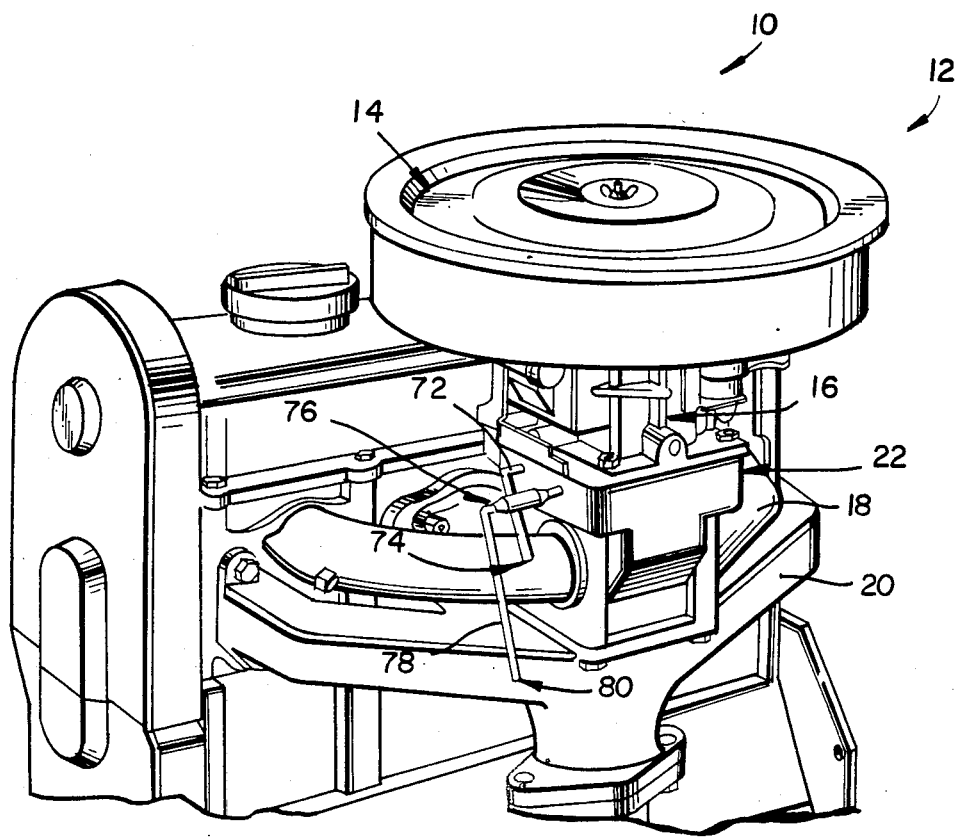
FIG. 1 is a diagrammatic, perspective view of an engine including a carburetor, an intake manifold and an exhaust manifold and showing the positioning of the present invention with respect thereto.

In order to provide heat to the vaporizing device 22, a heating conduit generally indicated at 60, is provided which includes straight portions 62 and 64, a connecting portion 66, and two end portions 68 and 70. End portion 68 is connected by means of a connecting line 72 to the intake manifold 18 at a connection shown in FIG. 1 at 74. The opposite end 70 is directly connected to a reservoir chamber, generally indicated at 76, with the opposite end of that chamber being connected to a separate connecting line 78 that leads directly to the exhaust manifold 20 and is connected thereto by a connection 80.

Conduit 60 is preferably $\frac{1}{4}$ inch copper tubing and the exhaust reservoir 76 is either separately formed and attached to end 70 of that conduit or it can be integrally formed therewith. Preferably exhaust reservoir 76 is substantially cylindrically shaped thereby defining sidewalls 82 and the ends, leading to end 70 of conduit 60 and to line 78, can be formed from conical segments as shown. Reservoir 76 is about 1.5 inches in length, from the end of one conical end portion to the other, and the cylindrical portion has a 1 inch interior diameter. Conduit end 70 preferably has a $\frac{3}{8}$ inch diameter which reduces to the $\frac{1}{4}$ inch tubing diameter of conduit 60 as it passes through hot plates 46–52. Connecting line 78 preferably has a $\frac{3}{8}$ inch diameter. Reservoir 76 is used in conjunction with the vacuum, applied from the intake manifold 18 through connecting line 72, and because of exhaust pressures in the exhaust manifold 20 applied through connecting lines 78, the reservoir will build up approximately a 1 pound pressure and provide a continuous volume of exhaust gas to be pulled through conduit 60. Hot air pulled from the exhaust system passes through reservoir 76 and through conduit 60. This raises hot plates 46–52 to temperatures of about 500° F. and consequently heats fluid flowing therepast or through. Any fuel drawn through the carburetor and contacting the hot plates is vaporized and thus leaves no raw gasoline to be exhausted. Accordingly, there is no downstream need for catalytic converters to combust unused gasoline. In test use, the exhaust did not contain black material, but rather the exhaust system stayed white and the interior of the engine remained clean.

The presence of openings 54 within the hot plates 46, 48, 50 and 52, serve to provide a great surface area that will be heated by the exhaust gas passing through conduit 60 thus more efficiently heating the air/fuel mixture, as well as increasing the velocity of the air/fuel mixture passing therethrough. Consequently, the fuel portion of that mixture is very efficiently vaporized, and the increased velocity, the output of the carburetor barrels serving to more finely and uniformly distribute the fuel within the air/fuel mixture.

While the invention has been described in connection with what is presently considered to be the most practical and preferred embodiment, it is to be understood that the invention is not to be limited to the disclosed embodiment, but on the contrary, is intended to cover various modifications and equivalent arrangements included withn the spirit and scope of the appended claims, which scope is to be accorded the broadest interpretation so as to encompass all such modifications and equivalent structures.

What I claim is:

1. A fuel vaporizer for use in cooperation with at least a two barrel carburetor and a fuel supply for an engine comprising a mounting plate for positioning the vaporizer between the carburetor and an engine manifold, said mounting plate having means defining an open interior, said open interior including at least two circularly shaped recesses, a plate member means positioned within each of said at least two circularly shaped recesses, said plate member means including means defining a plurality of through bores, each of said plate member means being axially aligned with one of the barrels in the carburetor, said fuel vaporizer further including means defining a hollow conduit passing through said mounting plate and through each of said plate member means so as to avoid said through bores therein, said conduit means terminating at first and second ends, each of which extends outwardly beyond said mounting plate, said first end being connected to an engine exhaust system, said second end being connected to an engine air intake system so that exhaust gases flow from said exhaust system through said hollow conduit means and into said air intake system and wherein said first end further includes means defining a separate reservoir chamber positioned exteriorly of said mounting plate and operatively connected within said conduit means so as to serve as a reservoir for exhaust gas being drawn through said conduit means.

* * * * *